March 9, 1937. H. W. ROSE 2,073,223
MEANS FOR DETERMINING COLOR DENSITY OF LIQUIDS
Filed Aug. 28, 1934 2 Sheets-Sheet 1

INVENTOR
HILTON W. ROSE
BY
Cook + Robinson
ATTORNEY

March 9, 1937. H. W. ROSE 2,073,223
MEANS FOR DETERMINING COLOR DENSITY OF LIQUIDS
Filed Aug. 28, 1934 2 Sheets-Sheet 2
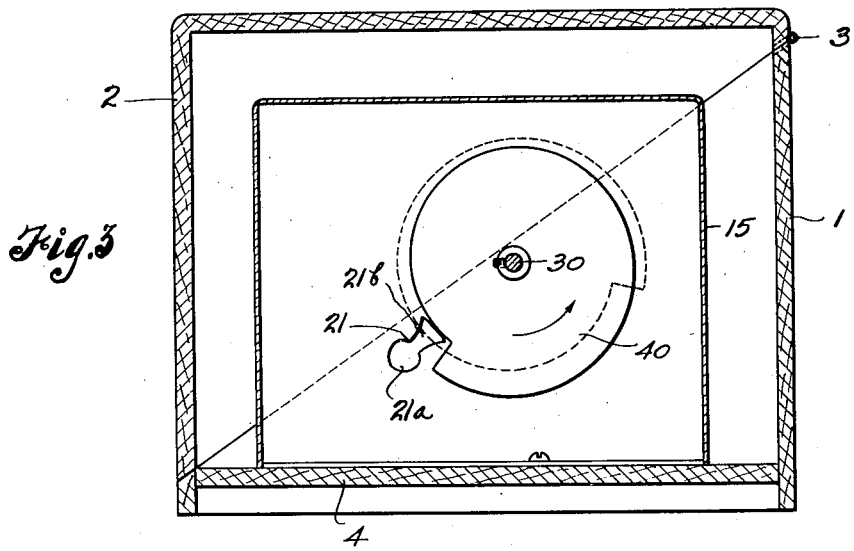
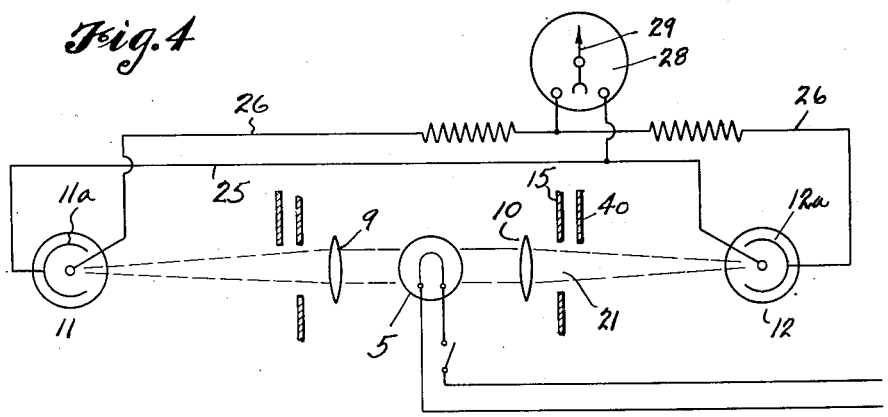
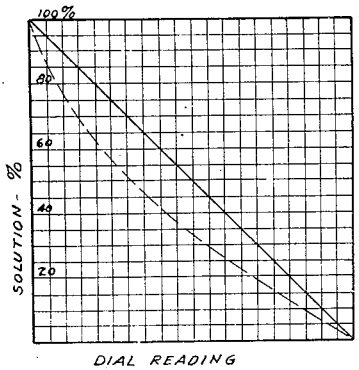
INVENTOR
HILTON W. ROSE
BY
Cook & Robinson
ATTORNEY Patented Mar. 9, 1937

2,073,223

UNITED STATES PATENT OFFICE 2,073,223

MEANS FOR DETERMINING COLOR DENSITY OF LIQUIDS

Hilton W. Rose, Seattle, Wash.

Application August 28, 1934, Serial No. 741,804

5 Claims. (Cl. 88—14)

This invention relates to improvements in means for measuring the density of liquids. More particularly, it relates to an electrical system for making density comparison of liquids, as used in blood chemistry work, with established density standards.

Explanatory to the present invention it will here be stated that the usual method for arriving at the density of a liquid is by color comparison, using the human eyes under direct or indirect lighting. It is quite obvious, however, that by reason of the human element entering into this method, error cannot be eliminated and there is apt to be wide variation between the conclusions of different individuals making the same color comparison.

In view of the above stated element of uncertainty, or error, in the usual method, it has been the principal object of this invention to provide an electrical means for estimating the density of colors accurately and quickly and from which means the human element, in which error is most apt to occur, has been eliminated.

More specifically stated, the present invention resides in the provision of a testing equipment including two photo-voltaic cells and a source of light common to both for setting up opposing currents through a galvanometer circuit, and whereby the galvanometer is caused to show a zero reading so long as the currents are of equal strength, but which will deviate from zero when a quantity of liquid to be tested is interposed between the source of light and one of said photo-voltaic cells; the amount of deviation being in accordance with the degree of density which is then accurately estimated by noting on an accurately calibrated scale the extent of adjustment required of a shutter to cut off an amount of light to the other cell that will cause the galvanometer needle to return to its zero reading.

It is also an object of this invention to provide a device for the above stated purpose, including a system of photo-voltaic cells with means associated therewith whereby the system may be accurately checked for any possible deviation from exact calibration, and correction of error made prior to each density test or reading.

It is a further object of the invention to provide an electrical system of the above character especially suitable for blood chemistry work but adapted also for determining the color density of dyes, varnishes, oils, paints and many other liquids.

Still further objects of the invention reside in the combination of parts used in the electrical system; in their functional relationship and in the method of using them, as will hereinafter be fully described.

In accomplishing these and other objects of the invention, I have provided the improved details of construction, the preferred forms of which are illustrated in the accompanying drawings, wherein—

Fig. 3 is a cross section taken on line 3—3 in Fig. 2, particularly illustrating the light regulating shutter.

Fig. 4 is a wiring diagram for the system.

Fig. 5 is a graph explanatory to operation of the device.

Figure 2:
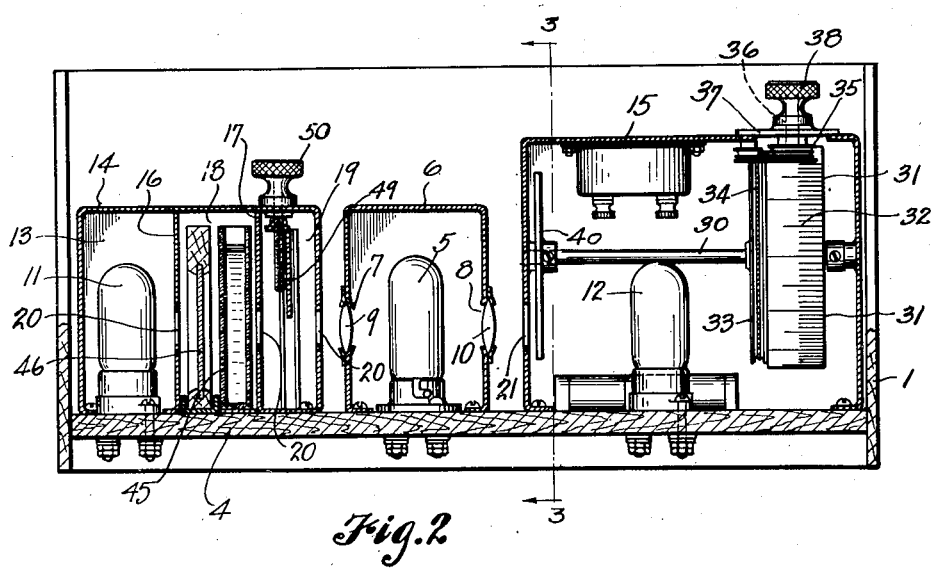
Fig. 2 is a cross section of the same in the vertical plane of line 2—2 in Fig. 1.

Referring more in detail to the drawings—

1 designates, in its entirety, what may be a suitable form of housing wherein the electrical equipment and devices associated therewith in the present invention are enclosed. This housing, as seen best in Fig. 3, has a cover portion 2, hingedly attached as at 3, and adapted to open upwardly thereby to expose and give easy access to the contained equipment.

The housing 1 includes a horizontal base or bottom wall 4, and mounted thereon, near the center of the housing, is an exciter lamp 5 of high candle power, enclosed within a metallic case 6. The casing is provided at opposite sides with openings 7 and 8 in which light focusing lenses 9 and 10 are fitted.

Located in the housing 1, respectively at opposite sides of the exciter lamp, are photo-voltaic cells 11 and 12. The cell 11 is enclosed within a compartment 13 of a metallic case 14 that is fixed on the base wall of the housing and the cell 12 is likewise contained within a metallic case 15 also fixed to the base of the housing. The case 14 has two partitions 16 and 17 therein defining separate compartments 13, 18, and 19, for purposes presently understood, and these partitions and the inner end wall 14a of the case 14 are provided with openings 20 in alinement between the lamp 5, and photo-voltaic cell 11 so that rays of light from the lamp 5, converged in passing through the lens 9, will be directed by the lens through these openings and concentrated on the sensitive plate 11a of the cell 11. Likewise, the housing 15 has an opening 21 in its inner side wall alined between the lamp 5 and the photo-voltaic cell 12 so that rays of light from the lamp in passing through the lens 10 will be converged thereby and directed onto the sensitive plate 12a of the photo-voltaic cell 12.

Figure 1:
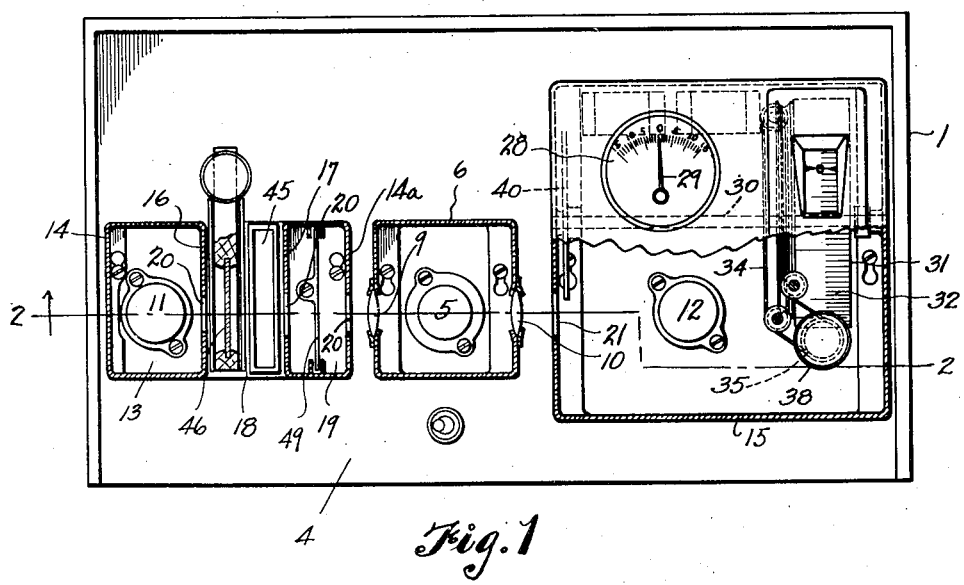
Fig. 1 is a view in plan of an apparatus embodied by the present invention; certain parts being broken away and some being shown in section for better illustration.

The two photo-voltaic cells 11 and 12 are electrically connected in opposing series, as shown in Fig. 4, by wires 25 and 26, and connected across these wires is a galvanometer 28 which indicates, by deflection of its needle 29, the amount of current flowing in the circuit. The galvanometer, as shown in Figs. 1 and 2, is attached to the top wall of the housing 15 and is readable through an opening therein.

Also mounted in the housing 15 by means of a horizontal, revolubly supported shaft 30, is a cylindrical indicator 31 on which a scale 32 is accurately calibrated. At one side of the indicator a belt wheel 33 is fixed relative to the shaft and a belt 34 operates thereon and tautly about a grooved sheave 35 fixed on the lower end of a short shaft 36 rotatably supported in a plate 37 applied to the top wall of housing 15. A knob 38 is attached to the upper end of the shaft 36 for rotating the sheave 35 and thereby to effect rotation of the shaft 30.

Fixed on the shaft 30 adjacent the end wall of housing 15 in a position to partially overlap the opening 21 therein and thereby cut off a percentage of light from lamp 5 to photo-cell 12, is a shutter disk 40. The disk, as seen in Fig. 3, has a solid body and a volute peripheral edge increasing in radial extent in passing about the disk, a distance almost equal to the width across the opening 21, which opening, as shown in Fig. 3, is of keyhole shape with a circular outer end opening 21a and a lateral slot 21b extending in a direction toward the center of the disk and of gradually increased width toward its inner end. The arrangement provides that by setting the disk 40 at the full end position of Fig. 3, the entire area of opening 21 will be uncovered, then by rotation of the disk counter-clockwise, this area will be gradually covered to the maximum amount provided for by the disk.

In the central compartment 18 of the case 14 is a carrier rack for a clear glass cup 45 in which the liquid to be tested is contained, and at the side of this is space for insertion of a glass plate 46 of a standardized color, which is used to initially calibrate the device but is entirely removed for making density or color tests of liquids in cup 45. Thus the plate 46, as seen in Figs. 1 and 2, would not be in the machine for ordinary testing.

It is understood that when the lamp 5 is energized, light rays therefrom will be converged by the lenses 9 and 10 onto the sensitive plates of the two photo cells 11 and 12 thereby to set up a flow of current in the electrical systems connecting them with the galvanometer. The current set up by each cell is directly proportional to the amount of light absorbed thereby, and if both currents are equal then the galvanometer will show a zero reading.

Therefore, if the galvanometer shows a zero reading and if the amount of light which is exciting the photo cell 11 should be diminished to any extent by a liquid placed in cup 45 between the cell and source of light, the current generated by that cell will be lessened in accordance with the density of the liquid.

In order that any deviation from zero reading of the galvanometer may be corrected prior to each test, there is provided a sliding shutter plate 49 in the compartment 19 of case 14 and this is adapted to be moved by an adjusting screw 50 to intercept any portion of light passing to cell 11. If, with the graduated dial 32 in zero position, the galvanometer should show deviation from zero, then the shutter plate is adjusted to admit more or less light to cell 11 in accordance with the requirement to bring the galvanometer needle to zero. The original zero setting is preferably obtained while using distilled water, as described. Immediately thereafter, a colored plate 46 is inserted and a balance reading taken. The plate 46 is preferably of about 40%–60% transmission, the actual transmission as determined by the instrument being then permanently noted on the plate 46. When at some subsequent time it is desired to use the instrument, it is not necessary to again obtain a distilled water cell to get a zero reading, but instead, the now calibrated plate 46 is inserted, the shutter 31 adjusted to give the reading indicated on the plate and if the galvanometer 15 is not in balance, then the minor adjustment is made by the modulating means 49 and 50.

It is quite essential or desirable in this case that either the shutter 40 or the opening 21 be so shaped that the opening movements of the shutter will be directly proportional on a uniformly spaced scale, located on the shutter, or associated gears, or dial mechanism, to the percent density of the solution to be measured on the opposite or any cell, thus eliminating the crowding of the reading scale into small space resulting in loss of sensitivity and difficulty in reading when measuring deep solutions.

In Fig. 5 is plotted, in dotted line, the deviation from a correct reading that would result to use of a uniform aperture 21 but which is corrected to the straight line by the particular shape given the opening 21.

With the parts of the device so arranged, a density test is made as follows:— First, the calibration test of the machine is made by filling the glass receptacle 45 with distilled water, then with the dial 31 set at zero reading, the adjusting nut 50 is manipulated to adjust shutter 49 to control the light to cell 11 to bring the needle of the galvanometer exactly to zero. Then, the sterile water is replaced in vessel 45 with whatever liquid is to be tested. This, of course, cuts off part of the light passing to cell 11 and causes the needle of the galvanometer to deviate from zero in accordance with the density of the liquid. Then by manipulation of the knob 38 the shutter 40 is rotated to reduce the amount of light passing to cell 12 to bring the galvanometer needle back to zero. When the shutter adjustment required to give a zero reading in the galvanometer has been made, a reading of the graduated dial is taken, and by referring this reading to an established scale of readings, the density of the liquid, as compared to established standards, is determined.

Having thus described my invention, what I claim as new therein and desire to secure by Letters Patent is—

1. A device of the character described comprising a single source of light, a pair of spaced photo-voltaic cells connected in opposing series, galvanometer means operatively connected to the cells to indicate differences in response thereof, means for directing light from said source upon each of said cells simultaneously, a light restricting fixed port provided with a symmetrical portion and a tongue extending therefrom positioned in the path of light from said source to one of said cells, a shutter operatively positioned with respect to said port and adapted to progressively mask the tongue portion of said fixed port, a graduated scale movable with said shutter, an adjustably positionable light modulating means between said light source and the other of said cells whereby a balanced response may be obtained between said cells when such shutter and graduated scale are at a predetermined position, and means for positioning substances of unknown light transmission value between said adjustable light modulating means and the said cell.

2. A device of the character described comprising a single source of light, a pair of spaced photo-voltaic cells connected in opposing series, galvanometer means operatively connected to the cells to indicate differences in response thereof, means for directing light from said source upon each of said cells simultaneously, a light restricting fixed port provided with a symmetrical portion and a tongue extending therefrom and of gradually increasing width positioned in the path of light from said source to one of said cells, a shutter operatively positioned with respect to said port and adapted to progressively mask the tongue portion of said fixed port, a graduated scale movable with said shutter, an adjustably positionable light modulating means between said light source and the other of said cells whereby a balanced response may be obtained between said cells when said shutter and graduated scale are at a predetermined position, and means for positioning substances of unknown light transmission value between said adjustable light modulating means and said cell.

3. A device of the character described comprising a single source of light, a pair of spaced photo-voltaic cells connected in opposing series, galvanometer means operatively connected to the cells to indicate differences in response thereof, means for directing light from said source upon each of said cells simultaneously, a light restricting fixed port provided with a symmetrical portion and a tongue extending therefrom and of gradually increasing width, a disc shutter provided with an involute edge portion operatively positioned with respect to said port and adapted to progressively mask the tongue portion of said fixed port, and an adjustably positionable light modulating means between said light source and the other of said cells and adapted to regulate the quantity of light passing therethrough whereby a balanced response from said cells may be obtained when said shutter is at a predetermined position.

4. In a device of the character described, the combination of: a source of light, a photovoltaic cell, a housing, a light restricting port in the housing between said light source and photovoltaic cell, means for directing light from the source through the port onto said cell, a shaft rotatably mounted in the housing, a shutter element mounted on the shaft, said shutter element being operatively positioned with respect to said port to progressively mask the same; a calibrated drum mounted on said shaft, a window in said housing cooperating with said drum, and means for adjustably positioning said drum, shaft and shutter.

5. In a device of the character described, the combination of: a single source of light, a pair of spaced photovoltaic cells connected in opposing series, galvanometer means operatively connected to the cells to indicate differences in response thereof, a housing for one of said cells, a light restricting port in the housing between said light source and cell, means for directing light from the source through the port onto said cell, a shaft rotatably mounted in the housing, a shutter element mounted on the shaft, said shutter element being operatively positioned with respect to said port to progressively mask the same, a calibrated drum mounted on said shaft, a window in said housing cooperating with said drum, and means for adjustably positioning said drum, shaft and shutter.

HILTON W. ROSE.